(12) United States Patent
Doetsch et al.

(10) Patent No.: US 7,139,341 B2
(45) Date of Patent: Nov. 21, 2006

(54) RECEIVER CIRCUIT FOR A COMMUNICATIONS TERMINAL AND METHOD FOR PROCESSING SIGNALS IN A RECEIVER CIRCUIT

(75) Inventors: Markus Doetsch, Schliern (CH); Joerg Plechinger, München (DE); Peter Jung, Otterberg (DE); Peter Schmidt, Erpolzheim (DE)

(73) Assignee: Infineon Technologies AG, Munich (DE)

( * ) Notice: Subject to any disclaimer, the term of this patent is extended or adjusted under 35 U.S.C. 154(b) by 644 days.

(21) Appl. No.: 10/008,774

(22) Filed: Nov. 13, 2001

(65) Prior Publication Data

US 2002/0085124 A1 Jul. 4, 2002

Related U.S. Application Data

(63) Continuation of application No. PCT/DE00/01447, filed on May 9, 2000.

(30) Foreign Application Priority Data

May 10, 1999 (DE) ................................. 199 21 444

(51) Int. Cl.
*H04B 1/10* (2006.01)
*G06F 17/10* (2006.01)

(52) U.S. Cl. .................... 375/349; 375/350; 708/316

(58) Field of Classification Search ................ 375/267, 375/340, 346, 349, 350, 347; 708/300, 316
See application file for complete search history.

(56) References Cited

U.S. PATENT DOCUMENTS

| | | | |
|---|---|---|---|
| 3,891,803 A | 6/1975 | Daguet et al. | |
| 5,243,598 A | 9/1993 | Lee | |
| 5,297,136 A | 3/1994 | Soprano et al. | |
| 5,311,457 A * | 5/1994 | Shizawa | 708/316 |
| 5,475,710 A | 12/1995 | Ishizu et al. | |
| 5,490,172 A | 2/1996 | Komara | |
| 5,544,128 A * | 8/1996 | Kim et al. | 367/119 |
| 5,712,879 A | 1/1998 | Tatsuta et al. | |
| 5,818,883 A | 10/1998 | Smith et al. | |
| 5,852,477 A | 12/1998 | Limberg | |
| 6,272,181 B1 * | 8/2001 | Matt | 375/242 |
| 6,314,147 B1 * | 11/2001 | Liang et al. | 375/346 |

FOREIGN PATENT DOCUMENTS

| | | |
|---|---|---|
| DE | 25 56 044 C3 | 6/1977 |
| DE | 42 19 308 C2 | 12/1992 |
| DE | 42 19 357 C2 | 1/1993 |

(Continued)

OTHER PUBLICATIONS

Pridham et al., Shifted Sideband Beamformer, Dec. 1979, IEEE Transactions on Acoustics, Speech, and Signal Processing, vol. 27, Issue 6, pp. 713-722.*

(Continued)

*Primary Examiner*—Jay K. Patel
*Assistant Examiner*—David B. Lugo
(74) *Attorney, Agent, or Firm*—Laurence A. Greenberg; Werner H. Stemer; Ralph E. Locher

(57) ABSTRACT

A receiver circuit for a communications terminal includes a signal pre-processing circuit having: an analog/digital converter device with K analog/digital converters connected in parallel, a conversion device, and a filter device connected downstream of the conversion device. The filter device has N digital filters connected in parallel, where N is an integer that is greater than or equal to 1 and is less than K.

14 Claims, 3 Drawing Sheets

FOREIGN PATENT DOCUMENTS

| | | |
|---|---|---|
| DE | 42 24 842 A1 | 2/1994 |
| WO | WO 91 07829 | 5/1991 |
| WO | WO 96/21288 | 7/1996 |
| WO | WO 96/21305 | 7/1996 |

OTHER PUBLICATIONS

Anonymous: "Software Radios", Microwave Journal, vol. 39, Feb. 1996, No. 2, pp. 128-136.

* cited by examiner

RECEIVER CIRCUIT FOR A COMMUNICATIONS TERMINAL AND METHOD FOR PROCESSING SIGNALS IN A RECEIVER CIRCUIT

CROSS-REFERENCE TO RELATED APPLICATION

This application is a continuation of copending International Application No. PCT/DE00/01447, filed May 9, 2000, which designated the United States.

BACKGROUND OF THE INVENTION

1. Field of the Invention

The invention relates to a receiver circuit having a signal-receiving device providing K analog reception signals, a signal pre-processing circuit configured downstream from the signal-receiving device, an analog/digital converter device having K analog/digital converters providing k digital signals, and a filter device connected downstream from the analog/digital converter device. The invention also relates to a method for signal processing using such a receiver circuit.

In conventional communications terminals, in particular in those, which are provided for wireless communication, a plurality (K) of reception signals are frequently processed in parallel. Within the scope of signal pre-processing, the K reception signals are first downmixed into an intermediate frequency range or into the baseband, then digitalized independently of one another by K analog/digital converters (A/D converters) and then fed—still independently of one another—to K digital filters which carry out digital broadband limitation for the purpose of channel selection.

This form of signal pre-processing requires a considerable implementation expenditure because of the multiple use of identical components, and is therefore, disadvantageous.

U.S. Pat. No. 5,852,477 describes a digital television receiver which uses, for example, 24 analog/digital converters which are connected in parallel to sample the received signal and a digital equalizer filter that is connected downstream of these converters. The converters are operated here cyclically with a correspondingly reduced sampling rate so that they successively sample the received signal.

International Patent Application WO 91/07829 discloses a mobile radio receiver with a plurality of reception antennas. Each reception antenna is assigned two analog/digital converters for converting the I and Q components of the reception signal and a digital filter with two outputs for the filtered I and Q components.

SUMMARY OF THE INVENTION

It is accordingly an object of the invention to provide receiver circuit for a communications terminal and a method of signal processing in a receiver circuit, which overcome the above-mentioned disadvantages of the prior art apparatus and methods of this general type. In particular, it is an object to provide a receiver circuit for a communications terminal, which can be implemented at relatively low cost. In addition, the invention is aimed at a method for processing signals in a receiver circuit of a communications terminal by means of which the expenditure for implementing the receiver circuit can be reduced.

With the foregoing and other objects in view there is provided, in accordance with the invention, a receiver circuit for a communications terminal, that includes: a signal-receiving device providing K analog reception signals; and a signal pre-processing circuit configured downstream from the signal-receiving device. The pre-processing circuit includes an analog/digital converter device having K analog/digital converters connected in parallel for sampling the K reception signals independently of one another with a sufficient sampling rate and for providing k digital signals. The pre-processing circuit also includes: a filter device connected downstream from the analog/digital converter device; and a conversion device configured between the analog/digital converter device and the filter device. The filter device has N digital filters connected in parallel for filtering the K digital signals. K and N are greater than zero, and the conversion device is configured such that N is less than K.

The idea on which the invention is based includes using a digital filter for filtering a plurality of digital signals, which are output by the A/D converters. The number of digital filters required can be reduced, as a result of which, both the costs in terms of components and the costs in terms of mounting for the receiver circuit can be favorably influenced.

In one particularly preferred embodiment of the invention, N=1, i.e. in total, just a single digital filter is used for broadband limitation of the K digital signals which are output by the A/D converters.

In accordance with an added feature of the invention, there is provided a first embodiment of the invention in which the conversion means includes a multiplexer. In the case N=1 which is considered above, the K digital signals are then multiplexed into a single reception signal for the digital filter means (or the single digital filter thereof). The use of a multiplexer thus permits digital filter means to be used with just one input.

In accordance with an additional feature of the invention, there is provided a second embodiment of the invention in which, the conversion means includes a plurality of, in particular K, zero-inserting elements which are connected in parallel. Because no multiplexer is required in the second embodiment, the expenditure for implementation is very low. In this embodiment, the conversion means has K outputs so that a digital filter means with K inputs is necessary.

The two embodiments described above can be combined with one another.

It is to be noted that the conversion means, in particular, even in the case of the second embodiment, does not need to be present as a separate component, but rather can be integrated into the digital filter means and can be implemented there within the scope of the signal calculation means, for example, even at the level of software.

A digital filter of the digital filter means can be an FIR or an IIR filter. As the order of magnitude L of the digital filter increases, the filter steepness, which can be achieved increases, but at the same time the computational effort required also rises. Preferably, the digital filter or filters is/are of an order of magnitude L between 5 and 20, in particular between 10 and 18.

Customarily, decimation, i.e. reduction of the sampling rate, is performed in the signal path downstream of a digital filter. An advantageous measure is to construct the digital filter in this case from a multiplicity of individual digital filters and sampling-rate-reduction circuits, which are located in series and arranged in an alternating fashion. By such cascading of the digital filter (with $N \geq 2$ of the digital filters) of the filter means, the computational effort required for the filtering operation can be reduced.

The use, according to the invention, of a digital filter of multiple signal processing can already be applied in a receiver circuit with just one reception sensor. In such a receiver circuit, it is in fact possible to generate a plurality (K) of reception signals by splitting the sensor reception signal which is output by the one reception sensor, which reception signals can then be further processed at low cost in accordance with the principle of the invention.

For example, in a mobile radio receiver it is already known to split the antenna reception signal into an in-phase reception signal and a quadrature reception signal that is phase-shifted by 90° with respect to the in-phase signal. The in-phase signal and the quadrature signal can then be processed in accordance with the invention.

In accordance with another feature of the invention, the signal-receiving means contains a plurality of reception sensors.

A plurality of reception sensors in the form of a plurality of reception antennas are used, for example, in base stations for cellular mobile radio systems. Each reception sensor has a spatially restricted reception characteristic, i.e. it can receive radio signals only from a specific spatial segment. A reception characteristic, which covers the entire space is provided by means of the plurality of reception sensors.

However, even in reception sensors without such a directional reception characteristic, it may be advantageous to provide a plurality of reception sensors, specifically because it is possible to achieve an information gain with multiple detection of the same radio signal, as a result of which, the immunity of the receiver to interference can be increased. The principle of multiple detection can be used both in base stations and in mobile stations of mobile radio systems, specifically, by using double or multiple antennas which are spaced apart from one another.

In a mobile station, such a double antenna can be embodied, for example, by means of the customary rod antenna and a second antenna, which is permanently attached as a planar antenna to the rear side of the housing. Another possibility is to implement the second antenna in the form of an additional, optional, external antenna (wire antenna or window antenna), which can be employed, for example, when the mobile station is used in a motor vehicle.

Reception sensors with a directional reception characteristic can of course also be implemented in the form of double or multiple antennas.

With a total number of K reception sensors, each reception sensor can be assigned precisely one A/D converter. If the signals that are output by the sensors (for example into the I branch and the Q branch) are split in accordance with the measure described above, the signal-receiving means of the receiver circuit according to the invention has a correspondingly lower number of reception sensors (for example K/2).

Other features which are considered as characteristic for the invention are set forth in the appended claims.

Although the invention is illustrated and described herein as embodied in receiver circuit for the communications terminal and method for processing signals in a receiver circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
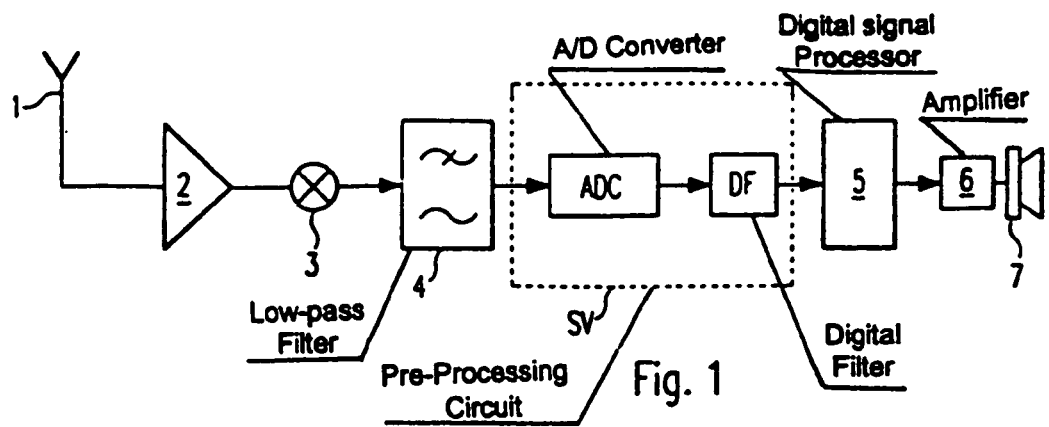
FIG. 1 is a block circuit diagram of a radio receiver.

Referring now to the figures of the drawing in detail and first, particularly, to FIG. 1 thereof, there is shown a schematic view of the signal path of a receiver circuit of a communications terminal, in the form of an example of a single channel. A reception sensor (antenna) 1 receives a radio signal. A sensor signal, which is output by the reception sensor 1 is amplified in an amplifier 2 and is fed to a mixing stage 3. In the mixing stage 3, the amplified sensor signal is downmixed into an intermediate frequency range or into the baseband. The downmixed signal is fed to an analog low-pass filter 4, which limits the signal to a bandwidth B. The signal, which is output by the analog low-pass filter 4 is input into a signal pre-processing circuit SV whose scope is indicated in FIG. 1 by a rectangle formed by dashed lines.

The signal pre-processing circuit SV has an A/D converter ADC at the input, which samples the broadband-limited signal, which is output by the analog low-pass filter 4.

The sampling is carried out with a sampling frequency f, which fulfils the Nyquist condition (f≧2B). If appropriate oversampling is carried out in order to achieve a high degree of precision. As a rule, more than one discrete sampling value is generated per received data symbol, i.e. $f > 1/T_s$, $T_s$ being the symbol duration.

In the case of band-spreading message transmission systems, for example, systems with code multiplexing (CDMA: code division multiple access) or radar systems, a sampling rate is used in which more than one sampled value is generated per chip, i.e. $f > 1/T_c$. $T_c$ designates the chip duration which is less than the symbol duration, because in band-spreading systems, each symbol is spread with a number of chips which is predefined as a function of the system standard.

The digital signal, which is output by the A/D converter ADC is fed to a digital filter DF. The digital filter carries out channel selection, which can be followed by decimation (i.e. reduction of the sampling rate). The decimation serves to limit the computational effort during the further signal processing.

The further signal processing can be carried out by means of a DSP 5. The DSP 5 receives the filtered digital signal and carries out further signal processing steps such as spread decoding, adaptive data detection, block demultiplexing, channel decoding and source decoding.

An output signal, which is made available at the output of the DSP 5, is amplified in an output amplifier 6 after a D/A conversion (not illustrated) and is provided to a suitable output means 7, for example, a loudspeaker (or an LCD screen or the like).

Figure 2:
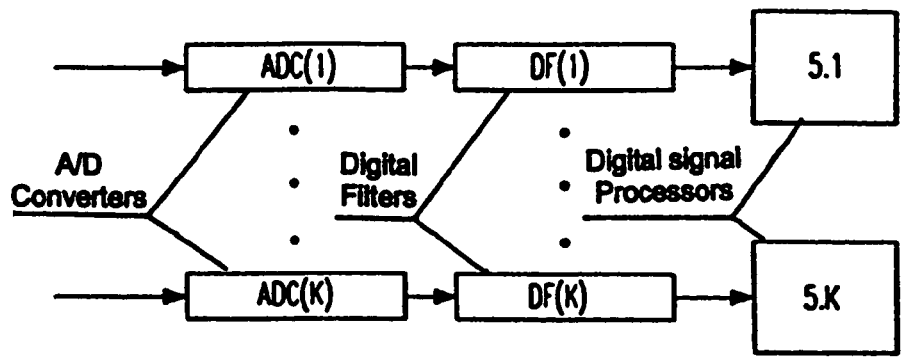
FIG. 2 is a block circuit diagram of a prior art signal pre-processing circuit with K downstream DSPs.

FIG. 2 shows a block circuit diagram of a prior art K-channel signal pre-processing circuit. The signal pre-processing circuit includes K parallel groups ADC(1), DF(1); ADC(2), DF(2); . . . ; ADC(K), DF(K) that are each composed of an ADC and a DF as shown in FIG. 1. The signals which are output by the digital filters DF(1), . . . , DF(K) are subjected, in accordance with FIG. 1, to further signal processing in K DSPs 5.1, . . . , 5.K.

Figure 3:
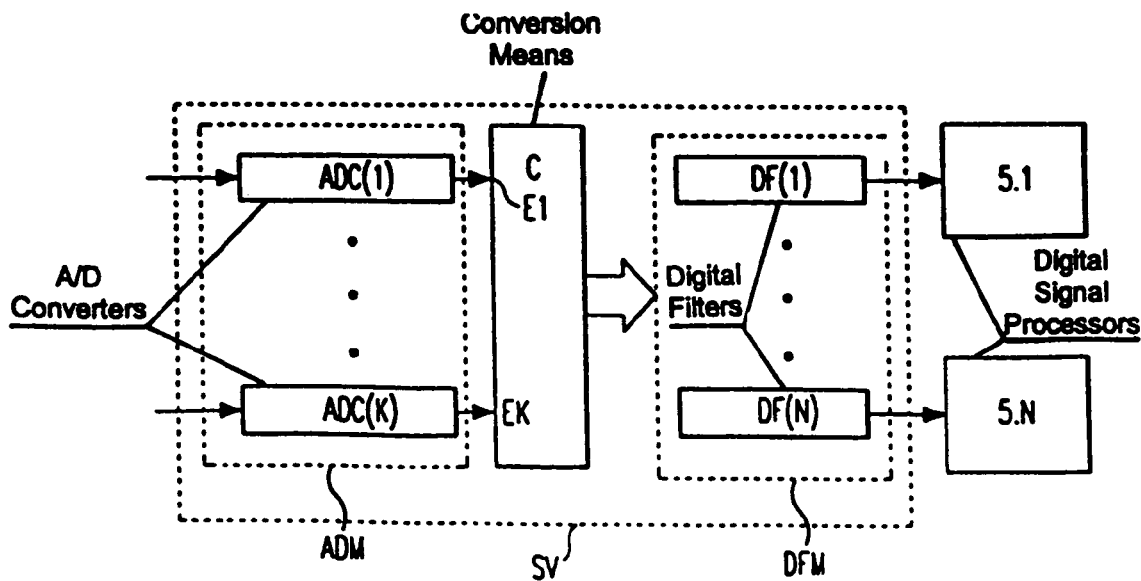
FIG. 3 is a block circuit diagram of an inventive signal pre-processing circuit with N downstream DSPs.

The block circuit diagram illustrated in FIG. 3 shows the structure of an inventive signal-processing circuit SV. The latter has K inputs which are each assigned to an A/D converter ADC(1), . . . , ADC(K). The inputs are fed by a signal-receiving means (not illustrated). The latter can be implemented in various ways. It can include, for example, K signal paths, connected in parallel, of the components 1, 2, 3, 4 shown in FIG. 1. It is also possible for just K/2 reception sensors (antennas) 1 to be provided, and for in each case two reception signals per reception sensor 1 to be provided for the signal pre-processing circuit SV by splitting the signals into the I branch and Q branch.

In the case of a communications terminal for wire-bound communication, the signal-receiving means can have, instead of the components 1, 2, 3, 4, other forms of implementation known in the art.

The A/D converters ADC(1), . . . , ADC(K) carry out sampling of the K sensor reception signals independently of one another, in accordance with the description in FIG. 1. In particular, a sufficiently high sampling rate is used here.

The digital output signals of the A/D converters ADC(1), . . . , ADC(K) are fed to K inputs E1, . . . , EK of a conversion means C.

In the signal path downstream of the conversion means C there is a digital filter means DFM which is composed of a number of N digital filters DF(1), . . . , DF(N) which are connected in parallel and are independent of one another. The digital filter means DFM has N outputs in the form in which it is generally implemented; N<K.

The conversion means C has the function of carrying out processing of the digital signals supplied by the A/D converters ADC(1), . . . , ADC(K) which makes the condition N<K possible. Two implementation possibilities relating to this will be explained with reference to FIGS. 4 and 5.

The N output signals of the digital filter means DFM are fed to N individual DSPs 5.1, . . . , 5.N and are then subjected to further signal processing according to FIG. 1.

Figure 4:
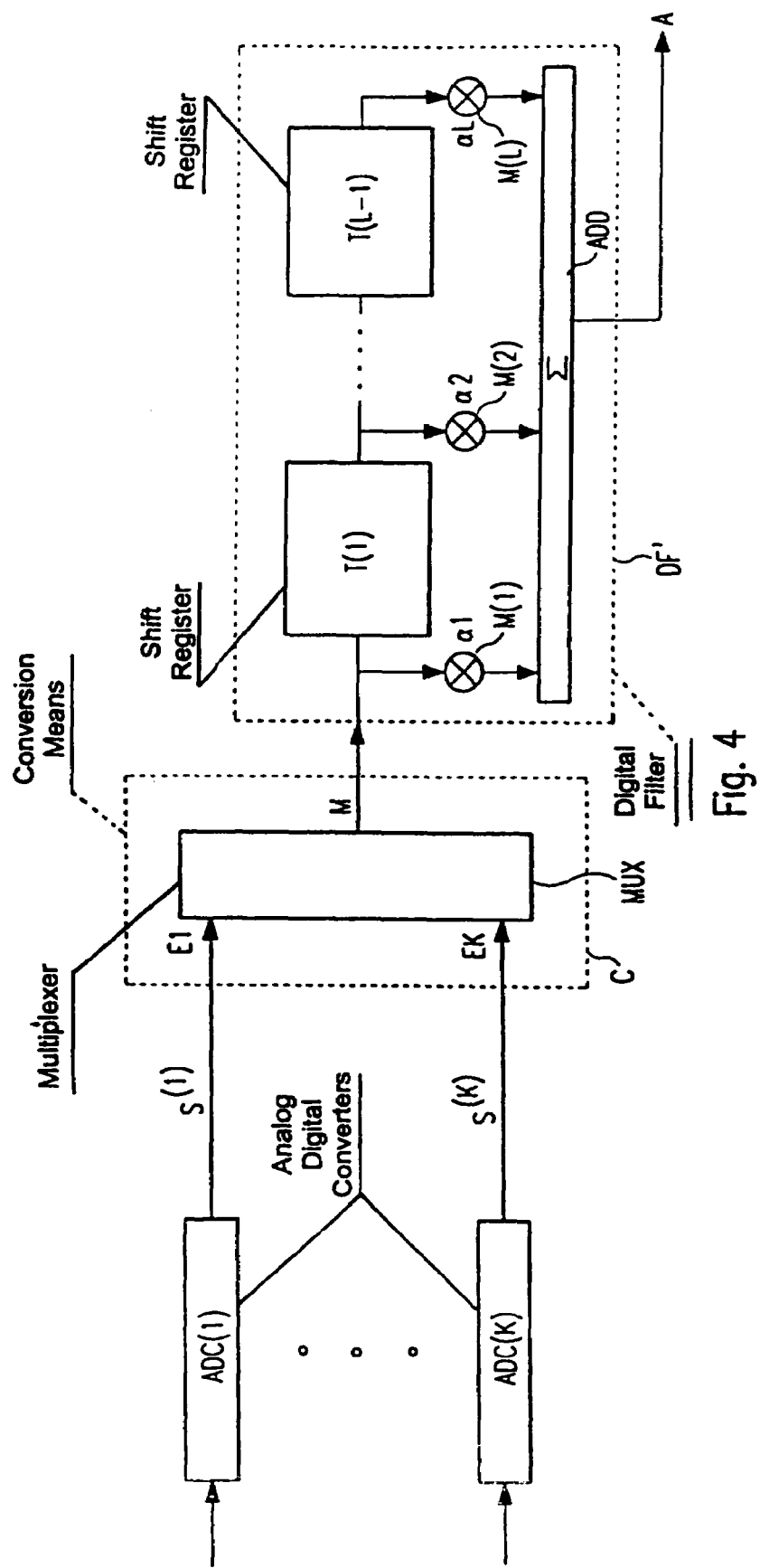
FIG. 4 is a block circuit diagram of a first embodiment of a signal pre-processing circuit for N=1.
Figure 5:
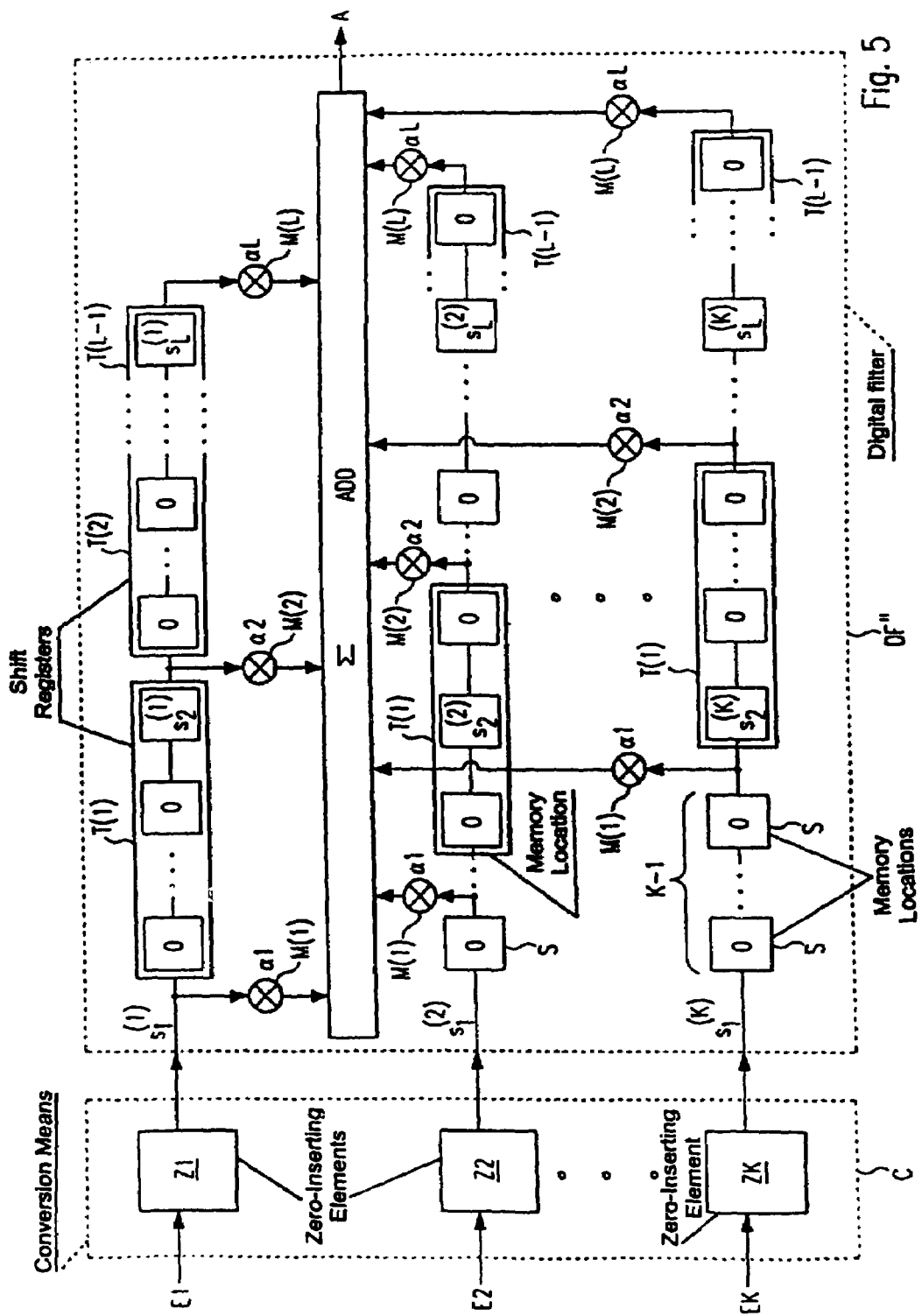
FIG. 5 is a block circuit diagram of second embodiment of a signal pre-processing circuit for N=1.

FIGS. 4 and 5 show two practical implementations of the signal-processing circuit SV for the case N=1. Given N=1, the digital filter means DFM has just one digital filter DF(1) with a filter output which is designated as DF' below.

According to FIG. 4, in each case the digital signals $S^{(1)}=(s^{(1)}_1, \ldots, s^{(1)}_P), \ldots, S^{(K)}=(s^{(K)}_1, \ldots, s^{(K)}_P)$, which can be represented as bit vectors, are available at the output of the A/D converters ADC(1), . . . , ADC(K). Each of the vectors $S^{(1)}, \ldots, S^{(K)}$ have P components (bits).

The digital signals are fed to the associated inputs E1, . . . , EK of the conversion means C, i.e. $S^{(1)}$ is fed to the input E1, $S^{(2)}$ is fed to the input E2, and . . . $S^{(K)}$ is fed to the input EK.

The conversion means C is implemented by a multiplexer MUX. The P·K-component vector is obtained at the output of the multiplexer MUX and is:

$$M=(s^{(1)}_1, s^{(2)}_1, \ldots, s^{(K)}_1; \ldots; s^{(1)}_P, s^{(2)}_P, \ldots, s^{(K)}_P)$$

The output signal of the multiplexer MUX is fed to the digital filter means which, as already mentioned, is composed of a single digital filter DF'. The digital filter DF' is of the order of magnitude L. It thus includes L multipliers M(1), M(2), . . . , M(L) with associated filter coefficients $\alpha 1$, $\alpha 2$, . . . , $\alpha L$ and a number (L-1) of shift registers T(1), . . . , T(L-1). Each shift register has K memory locations and therefore delays the multiplexed signal by K system clocks.

The outputs of the multipliers M(1), M(2), . . . , M(L) are fed to an adder ADD which generates the output signal A of the digital filter DF'.

A set of filter coefficients ($\alpha 1, \alpha 2, \ldots, \alpha L$) defines the transmission bandwidth of the digital filter DF'. The digital filter DF' can be configured as an externally configurable filter by replacing the set of coefficients.

FIG. 5 shows a further implementation possibility of the conversion means C and of the digital filter means DFM. Here too, N=1, i.e. the digital filter means DFM is formed by a single digital filter DF".

The digital signals of the A/D converters ADC(1), . . . , ADC(K) are in turn present at the inputs E1, E2, . . . , EK of the conversion means C. The conversion means C has here K parallel independent zero-inserting elements Z1, Z2, . . . , ZK. Each zero-inserting element Z1, Z2, . . . , ZK inserts a number of (K-1) zeros after each sampled value of the digital signal which is input at the input end, thus increasing the sampling rate to the K-multiple of the sampling rate of the A/D converters ADC(1), . . . , ADC(K) which are not illustrated.

The K outputs of the conversion means C are fed to K inputs of the digital filter DF".

In the signal path of the signal which is output by the first zero-inserting element Z1, L-1 shift registers T(1), T(2), . . . , T(L-1) are arranged in series. Each shift register has K memory locations.

In addition, L multipliers M(1), M(2), . . . , M(L) are provided which tap the signal path in question at the point upstream of the first shift register T(1), at all of the points between the aforesaid shift registers T(1), . . . , T(L-1), and at the output of the last shift register T(L-1). Filter coefficients $\alpha 1, \alpha 2, \ldots, \alpha L$ are in turn assigned to the multipliers M(1), M(2), . . . , M(L). The outputs of the multipliers M(1), M(2), . . . , M(L) are input into an adder ADD.

The signal path which is assigned to the second input of the digital filter DF" differs in structural terms from the first signal path described above only in that a single additional memory location S is provided upstream of the first shift register T(1).

In the signal path (not illustrated) which is assigned to the third input of the digital filter DF", two additional memory locations are already arranged upstream of the first shift register; this structure is continued with respect to the further inputs, and consequently (K-1) additional memory locations S are arranged in the K-th signal path upstream of the first shift register T(1).

FIG. 5 shows an instantaneous recording of the memory location states with reference to the vectors $S^{(1)}$ to $S^{(K)}$. With respect to the first signal path, the bit $s^{(1)}_1$ is present at the input of the first shift register T(1) and at the input of the first multiplier M(1). The first (K-1) memory locations of the first shift register T(1) have the state 0. The last memory location of T(1) stores the value of the bit $s^{(1)}_2$.

A memory location assignment according to this pattern is repeated for the remaining shift registers T(2) to T(L-1) in the first signal path. The last memory location of the shift register T(L-1) stores the value of the bit $s^{(1)}_L$.

In total, the first signal path has a number of K(L-1) memory locations.

The states of the individual memory locations in the second to K-th signal paths (with reference to the vectors $S^{(2)}$ to $S^{(K)}$) are also given in FIG. 5.

It becomes clear that the digital filter DF" has in total $K[K(L-1)+0.5(K-1)]$ memory locations.

The output signal A of the digital filter DF" is generated by the adder ADD. Further signal processing can be carried out according to FIG. 1.

The digital filters DF', DF" illustrated in FIGS. 4 and 5 can be implemented in a cascade design. This has the advantage that sampling-rate-reducing circuits can be inserted between the individual filters of the filter cascade and permit successive reduction of the computational effort in the individual filters in the direction of the signal path.

The structures shown in FIGS. 4 and 5 ultimately represent a computational rule according to which the digital signals which are output by the A/D converters ADC(1), . . ., ADC(K) are to be processed. The signal-processing circuit SV can therefore also be implemented in its entirety, or in certain sections (for example only with respect to the digital filter means DF' or DF"), by means of a programmable signal processor, which operates according to an algorithm which implements this computational rule.

We claim:

1. A receiver circuit for a communications terminal, comprising:
   a signal-receiving device providing K analog reception signals, K being greater than one; and
   a signal pre-processing circuit configured downstream from said signal-receiving device;
   said pre-processing circuit including:
      an analog/digital converter device having K analog/digital converters connected in parallel for sampling the K reception signals independently of one another with a sufficient sampling rate and for providing K digital signals;
      a multiplexer for multiplexing the K digital signals and outputting at least one multiplexer output signal formed from the K multiplexed signals; and
      a digital filter device for filtering the at least one multiplexer output signal, said digital filter device having memory elements formed by shift registers of length K, and said digital filter device including:
         a plurality of single digital filters; and
         sampling rate reduction circuits configured in series in an alternating fashion.

2. The receiver circuit according to claim 1, wherein said digital filter device has an order of magnitude L between 5 and 20.

3. The receiver circuit according to claim 1, wherein said digital filter device has an order of magnitude L between 10 and 18.

4. The receiver circuit according to claim 1, wherein:
   said signal-receiving device includes a single reception sensor outputting a single sensor reception signal; and
   the K reception signals are generated by splitting the reception signal.

5. The receiver circuit according to claim 1, wherein:
   said signal-receiving device includes a single reception sensor outputting a single sensor reception signal; and
   the K reception signals are generated by splitting the reception signal into an in-phase reception signal and a quadrature reception signal.

6. The receiver circuit according to claim 1, wherein said signal-receiving device includes a plurality of reception sensors, each of said plurality of said reception sensors has a directional reception characteristic for sensing radio signals in a predefined spatial segment.

7. A mobile station of a mobile radio system, comprising:
   a signal-receiving device providing K analog reception signals, K being greater than one; and
   a signal pre-processing circuit configured downstream from said signal-receiving device;
   said pre-processing circuit including:
      an analog/digital converter device having K analog/digital converters connected in parallel for sampling the K reception signals independently of one another with a sufficient sampling rate and for providing K digital signals;
      a multiplexer for multiplexing the K digital signals and outputting at least one multiplexer output signal formed from the K multiplexed signals; and
      a digital filter device for filtering the at least one multiplexer output signal, said digital filter device having memory elements formed by shift registers of length K, and said digital filter device including:
         a plurality of single digital filters; and
         sampling rate reduction circuits configured in series in an alternating fashion.

8. A receiver circuit for a communications terminal, comprising:
   a signal-receiving device providing K analog reception signals, K being greater than one; and
   a signal pro-processing circuit configured downstream from said signal-receiving device;
   said pre-processing circuit including:
      an analog/digital converter device having K analog/digital converters connected in parallel for sampling the K reception signals independently of one another with a sufficient sampling rate and for providing K digital signals;
      a stage containing K digital zero-inserting elements that are connected in parallel, each of said zero-inserting elements being fed with a respective one of the K digital signals and inserts K-1 zeros per sampling value of the respective one of the K digital signals into the respective one of the K digital signals; and
      a digital filter device for filtering the K digital signals with inserted zeros, said digital filter device having memory elements formed by shift registers of length K, and said digital filter device including:
         a plurality of single digital filters; and
         sampling rate reduction circuits configured in series in an alternating fashion.

9. The receiver circuit according to claim 8, wherein said digital filter device has an order of magnitude L between 5 and 20.

10. The receiver circuit according to claim 8, wherein said digital filter device has an order of magnitude L between 10 and 18.

11. The receiver circuit according to claim 8, wherein:
    said signal-receiving device includes a single reception sensor outputting a single sensor reception signal; and
    the K reception signals are generated by splitting the reception signal.

12. The receiver circuit according to claim 8, wherein:
    said signal-receiving device includes a single reception sensor outputting a single sensor reception signal; and
    the K reception signals are generated by splitting the reception signal into an in-phase reception signal and a quadrature reception signal.

13. The receiver circuit according to claim 8, wherein said signal-receiving device includes a plurality of reception sensors, each of said plurality of said reception sensors has a directional reception characteristic for sensing radio signals in a predefined spatial segment.

14. A receiver circuit for a communications terminal, comprising:
- a signal-receiving device providing K analog reception signals, K being greater than one; and
- a signal pre-processing circuit configured downstream from said signal-receiving device, said signal pre-processing circuit including:
    - an analog/digital converter device having K analog/digital converters connected in parallel for sampling the K reception signals independently of one another with a sufficient sampling rate and for providing K digital signals;
    - a stage containing K digital zero-inserting elements that are connected in parallel, each of said zero-inserting elements being fed with a respective one of the K digital signals and inserting K−1 zeros per sampling value of the respective one of the K digital signals into the respective one of the K digital signals; and
    - a digital filter device for filtering the K digital signals with inserted zeros, said digital filter device having K inputs, wherein a k-th input. k=1, . . . K, respectively, is connected to a series of
        - a number of K−1 leading memory locations; and
        - a given number of following memory elements each formed by shift registers of a length of K memory locations.

* * * * *